United States Patent [19]

Ostermeyer

[11] 4,362,568

[45] Dec. 7, 1982

[54] PETROLEUM DISTILLATE FREE PRIME COAT MATERIAL

[75] Inventor: Larry F. Ostermeyer, West Lafayette, Ind.

[73] Assignee: K. E. McConnaughay, Inc., Lafayette, Ind.

[21] Appl. No.: 194,385

[22] Filed: Oct. 6, 1980

[51] Int. Cl.³ .................. C08L 93/00; C08L 95/00
[52] U.S. Cl. .................. 106/232; 106/238; 106/277
[58] Field of Search .......... 106/232, 238, 277, DIG. 7

[56] References Cited

U.S. PATENT DOCUMENTS 2,855,319 10/1958 McConnaughay ................. 106/123
3,556,827 1/1971 McConnaughay ................. 106/279

*Primary Examiner*—Allan Lieberman
*Assistant Examiner*—P. Short
*Attorney, Agent, or Firm*—Jenkins, Coffey, Hyland, Badger & Conard

[57] ABSTRACT

A petroleum distillate-free or essentially petroleum distillate-free prime coat material for application to absorptive surfaces, such as untreated road or street surfaces, which is designed to penetrate, bond, and stabilize such existing surfaces and to promote adhesion between such surfaces and construction courses that follow. This type of material is also often used as a dust palliative. For this purpose, the material is applied to an untreated surface to control dust.

20 Claims, No Drawings

PETROLEUM DISTILLATE FREE PRIME COAT MATERIAL

This invention relates to asphalt cements, high viscosity residual fuels such as bunker, and emulsions, and particularly to a petroleum distillate-free or essentially petroleum distillate-free penetrating emulsion prime coat material.

In the asphalt and bituminous materials industry, a prime coat is an application of a low-viscosity bituminous material to an absorptive surface, such as an untreated base or surface. The prime coat is a material designed to penetrate, bond, and stabilize the existing base or surface, and to promote adhesion between the existing base or surface and a construction course, such as a new surface, that is to be applied subsequently. If no construction course is to be placed on the application, it is referred to as a dust palliative.

Currently, cut-back asphalt, petroleum residues blended with petroleum distillates, is being used as a penetrating prime coat. Also currently in use are the so-called "inverted emulsions" which are suspensions of minute globules of water or of an aqueous solution in a liquid bituminous material. Both of these currently used prime coat materials contain high percentages of petroleum distillates, such as, for example, kerosene. Not only are these distillates expensive and becoming more expensive with time, but their use as solvents is a waste of energy. Further, certain agencies such as the Environmental Protection Agency are concerned about the emission of volatile organic compounds into the atmosphere. The application and curing of these materials in prime coats causes large amounts of volatile organic compounds to be emitted into the atmosphere in the form of, for example, fuel oil vapors.

According to the invention, a process for manufacturing a bituminous emulsion which is essentially petroleum distillate-free is provided. Also according to the present invention, a number of specific petroleum distillate-free, or essentially petroleum distillate-free, prime coat materials are disclosed.

Currently available bituminous emulsions, suspension of minute globules of bituminous material in water or aqueous solutions, do not work well as penetrating prime coats on granular base or surface materials where the surface voids in the materials are small. Small surface voids, which occur more often than larger surface voids suitable for penetration by bituminous emulsions, serve to filter and trap asphalt particles on the surface and totally negate the use of such bituminous emulsions as prime coats. The processes and formulations of the present invention yield much smaller globules and uniform dispersions of the bituminous material. The result is that stable bituminous emulsions can be made which will penetrate even very small surface voids in granular base or surface materials without the presence of petroleum distillate solvents, or essentially without the presence of petroleum distillate solvents.

The present invention is intended to fill the need for a penetrating prime that does not contain a high percentage of petroleum distillates. Penetrating primes currently in use contain large volumes of costly petroleum distillate solvents. The invention provides an emulsified bituminous material that will penetrate most granular bases, even those with small surface voids, with no petroleum distillate in the emulsion or essentially no petroleum distillate in the emulsion. In certain examples, small amounts of petroleum distillates may be desirable, but these amounts are far less than those currently required by prime coat formulations.

The penetrating prime emulsions of the present invention include relatively high contents of emulsifiers prepared from tall oil, tall oil pitch, or tall oil derivatives or some combination of these, reacted with caustic compounds, such as sodium hydroxide or potassium hydroxide. The emulsifier, once the water which forms the emulsion has evaporated, becomes an integral part of the resulting binder.

The modified sand test penetration test to which reference is made herein was conducted by blending 95 parts of special screened silica sand (ASTM 20326 graded sand), such as that available from Bellrose Silica Company, Ottawa, Ill. 61350, with 5 parts hydrated lime which will pass through a No. 200 mesh sieve. This is typical of most plasterer's hydrated lime available at, for example, building supply companies. This sand-lime mixture is then blended with 1.6%, by weight, water until the water and sand-lime mixture are completely blended. The dampened sand-lime mixture is then placed into a beaker to a depth of not less than 1½ inches (3.18 cm) and compacted by lightly tamping it. Then a quantity of prime coat emulsion whose penetrating characteristic is to be measured (illustratively, 0.35 gallon per square yard of surface to be penetrated) is poured onto the compacted sand-lime mixture in the beaker. As the prime coat emulsion being measured is poured onto the top surface of the compacted sand-lime mixture in the beaker, a stopwatch is started. The stopwatch is stopped when the prime coat emulsion has completely penetrated the compacted sand-lime mixture and a dry surface (free of excess binder material) results. The time in seconds and depth of penetration in fractions of an inch are recorded as the modified sand penetration time and depth.

Other tests performed on the emulsions or the residues of the emulsions were conducted in accordance with ASTM Standard Methods of Testing Emulsified Asphalts D-244. They were as follows:

(1) Viscosity, Saybolt Furol at 77° F. (25° C.).
(2) Residue by Distillation.
(3) Penetration on the residue at 77° F. (25° C.) 100 grams, 5 seconds.
(4) Float Test on the residue at 140° F. (60° C.).

Exemplary formulations for the prime coat emulsions of the present invention follow.

EXAMPLE 1

In the first formulation, 500 grams of asphalt cement, grade AC-5, with ASTM D-5 penetration at 77° F. of 188, were blended with 500 grams of tall oil pitch, 5 grams of crude tall oil, 21 grams of sodium hydroxide, and 974 grams of water, resulting in a prime coat emulsion having a Saybolt Furol viscosity at 77° F. (25° C.) of 21 seconds. On distillation, the emulsion had only a trace of oil distillate. The distillation residue constituted 50.3%, by weight, of the emulsion. A penetration test on the residue at 77° F. gave a reading of 195. The float test of the residue at 140° F. gave a reading of 1200+ seconds. The modified sand penetration time was 200 seconds and the depth of penetration was ¼ inch (0.635 cm).

EXAMPLE 2

In a second example, 500 grams of asphalt cement, grade AC-5, again with a penetration of 188, were blended with 500 grams of tall oil pitch, 5 grams of distilled tall oil, 21 grams of sodium hydroxide, and 974 grams of water. The resulting prime coat bituminous emulsion exhibited a Saybolt Furol viscosity of 39 seconds when measured at 77° F. (25° C.). On distillation, this prime coat material yielded only a trace of oil distillate and 49.8% residue by weight of the emulsion. This emulsion residue had a penetration of 175. The float test result on this residue was 1200+ seconds. In the modified sand penetration test, 98 seconds were required for penetration and the depth of penetration was ¼ inch (0.635 cm).

EXAMPLE 3

In a third example, 500 grams of asphalt cement, grade AC-5, with a penetration of 188, were blended with 500 grams of tall oil pitch, 10 grams of VINSOL resin, 21 grams of sodium hydroxide, and 969 grams of water. This prime coat emulsion had a Saybolt Furol viscosity at 77° F. (25° C.) of 27 seconds. On distillation, there was no oil distillate and the distillation residue was 50.4% by weight of the emulsion. The penetration of the residue was 173, and the float test value was 1200+ seconds. The modified sand penetration time was 101 seconds and penetrated to a depth of ¼ inch (0.635 cm).

EXAMPLE 4

In a fourth formulation, 400 grams of asphalt cement, grade AC-5, again with a penetration of 188, were blended with 400 grams of tall oil pitch, 5 grams of crude tall oil, 17 grams of sodium hydroxide, and 1178 grams of water. This prime coat emulsion had a Saybolt Furol viscosity at 77° F. (25° C.) of 11 seconds. On distillation, there was a trace of oil distillate. The distillation residue was 40.1% by weight of the emulsion. The penetration of the residue was 193. The float test yielded a figure of 1200+ seconds. The modified sand penetration test values were 39 seconds and a depth of ¼ inch (0.635 cm) penetration.

EXAMPLE 5

In another example, 400 grams of asphalt cement, grade AC-5, were blended with 400 grams of tall oil pitch, 5 grams of distilled tall oil, 17 grams of sodium hydroxide, and 1178 grams of water. The Saybolt Furol viscosity, at 77° F. (25° C.) was 11.5 seconds. On distillation, there was a trace of oil distillate. The residue after distillation was 40.1% by weight of the emulsion. The penetration of the residue was 179. The float test value was 1200+ seconds. The modified sand penetration test resulted in 33 seconds and a depth of ¼ inch (0.635 cm).

EXAMPLE 6

In this formulation, 400 grams of asphalt cement, grade AC-5, were blended with 400 grams of tall oil pitch, 10 grams of VINSOL resin, 17 grams of sodium hydroxide, and 1173 grams of water. The resulting prime coat emulsion had a Saybolt Furol viscosity at 77° F. (25° C.) of 10 seconds. On distillation, no oil distillate was obtained, and the residue after distillation was 40.3%, by weight, of the emulsion. The penetration was 176. The float test yielded a result of 1200+ seconds. In the modified sand penetration test, this formulation penetrated in 14 seconds to a depth of ¼ inch (0.635 cm).

EXAMPLE 7

In this formulation, 480 grams of asphalt cement, grade AC-5, were blended with 320 grams of tall oil pitch, 20 grams of potassium hydroxide and 1180 grams of water. This emulsion yielded a Saybolt Furol viscosity at 77° F. (25° C.) of 14 seconds. On distillation, the oil distillate was 0.5% by weight of the emulsion, and the residue after distillation was 42.2% by weight of the emulsion. The penetration test yielded a result of 120. The float test yielded a result of 1200+ seconds. The modified sand penetration test required 121 seconds and penetration to a depth of 3/16 inch (0.476 cm) was measured.

EXAMPLE 8

In the eighth formulation, 480 grams of asphalt cement, grade AC-5, were blended with 320 grams of tall oil pitch, 12 grams of sodium hydroxide, and 1188 grams of water. The Saybolt Furol viscosity of this sample at 77° F. (25° C.) was 12 seconds. A trace of oil distilled from the sample on distillation and the residue was 39.8% by weight of the emulsion. The penetration test yielded a result of 124. The float test result was 1200+ seconds. In the modified sand penetration test, 70 seconds were required and penetration to a depth of 3/16 inch (0.476 cm) was achieved.

EXAMPLE 9

In this formulation, 486 grams of asphalt cement, grade AC-5, were blended with 360 grams of tall oil pitch, 14 grams of sodium hydroxide, 1086 grams of water, and 54 milliliters of No. 2 fuel oil. The Saybolt Furol viscosity of the emulsion at 77° F. (25° C.) was 40 seconds. On distillation, 1% by weight of the emulsion was oil distillate, and the residue was 45.2% by weight of the emulsion. The penetration test result was 216. The float test result was 1200+ seconds. The modified sand penetration test indicated 3900 seconds for this sample with a penetration depth of 3/16 inch (0.476 cm).

EXAMPLE 10

In this formulation, 432 grams of asphalt cement, grade AC-5, were blended with 320 grams of tall oil pitch, 13 grams of sodium hydroxide, 1187 grams of water, and 48 milliliters of No. 2 fuel oil. The Saybolt Furol viscosity of the resulting emulsion was 23 seconds at 77° F. (25° C.). On distillation, 0.5% by weight of the emulsion was oil distillate. The residue after distillation was 39.2% by weight of the emulsion. The penetration test result on the residue was 209. The float test result was 1200+ seconds. In the modified sand penetration test, 194 seconds were required for the material to penetrate and a depth of 3/16 inch (0.476 cm) was obtained.

As will be appreciated, Examples 9 and 10 are emulsions with low petroleum distillate content, as opposed to the emulsions of Examples 1-8 which were petroleum distillate-free. These low petroleum distillate-containing emulsions did penetrate into the modified sand, but not as readily as the petroleum distillate-free emulsions of Examples 2-8.

EXAMPLE 11

In this example, 800 grams of tall oil pitch were blended with 40 grams of sodium hydroxide and 1160 grams of water. This prime coat material had a Saybolt Furol viscosity at 77° F. (25° C.) of 32 seconds. On distillation, 1.5% by weight of the sample came off as oil distillate. The residue after distillation was 39.8% by weight of the sample. The penetration test result on this sample was 34. The float test gave a result of 1200+ seconds. In the modified sand penetration test, 28 seconds were required and the sample penetrated the modified sand to a depth of ¼ inch (0.635 cm).

It is to be noted that in this formulation, no asphalt cement was used.

EXAMPLE 12

In this formulation, 560 grams of asphalt cement, grade AC-5, were blended with 240 grams of tall oil pitch, 10 grams of sodium hydroxide, and 1190 grams of water. The Saybolt Furol viscosity of this sample at 77° F. (25° C.) was 14 seconds. On distillation, there was no oil distillate, and the residue after distillation was 39.6% by weight of the emulsion. The penetration test result was 214. The float test result was 238 seconds. In the modified sand penetration test, 1466 seconds were required and the sample penetrated to a depth of 3/16 inch (0.476 cm).

EXAMPLE 13

In this sample, 640 grams of asphalt cement, grade AC-5, were blended with 160 grams of tall oil pitch, 6 grams of sodium hydroxide, and 1194 grams of water. The Saybolt Furol viscosity of this sample at 77° F. (25° C.) was 11 seconds. On distillation, none of the sample distilled as oil distillate. After distillation, 39.7% by weight of the emulsion remained as residue. The penetration test result was 204. The float test result was 236 seconds. In the modified sand penetration test, although there was some penetration, there was also considerable matting of the prime coat material on the surface of the modified sand. It is believed that this formulation would serve adequately as a prime coat material for a base having larger surface voids.

EXAMPLE 14

In this sample, 480 grams of No. 6 fuel were blended with 320 grams of tall oil pitch, 12 grams of sodium hydroxide, and 1188 grams of water. The Saybolt Furol viscosity of this sample at 77° F. (25° C.) was 30 seconds. On distillation, 3% by weight of the emulsion came off as oil distillate. The residue after distillation was 38.5% by weight of the emulsion. The penetration test result on this residue was 242. The float test result was 1200+ seconds. In the modified sand penetration test, 78 seconds were required and the emulsion penetrated the modified sand to a depth of ⅜ inch (0.953 cm).

EXAMPLE 15

In this sample, 480 grams of asphalt cement, grade AC-20, were blended with 320 grams of tall oil pitch, 12 grams of sodium hydroxide, and 1188 grams of water. The Saybolt Furol viscosity at 77° F. (25° C.) was 11 seconds. A slight trace of oil distilled from the sample on distillation and the residue was 40.2% by weight of the emulsion. The penetration test yielded a result of 160. The float test result was 1200+ seconds. In the modified sand penetration test, 13 seconds were required and penetration to a depth of 5/16 inch (0.794 cm) was achieved.

What is claimed is:

1. An essentially petroleum distillate-free prime coat emulsion, comprising 0 to about 40% asphalt cement, about 5% to about 45% tall oil, tall oil fractions, or mixtures thereof, the tall oil, fractions, or mixtures thereof being present in sufficient quantity that it comprises at least 20%, by weight, of the combined weight of the asphalt cement and tall oil, fractions or mixtures, about 40% to about 65% water, and about 0.2% to about 3% of a strong base, the tall oil, fractions, or mixtures thereof and the strong base functioning as an emulsifier or emulsifying agent.

2. The emulsion of claim 1 wherein the base is an inorganic base.

3. The emulsion of claim 2 wherein the inorganic base is sodium hydroxide or potassium hydroxide.

4. The emulsion of claim 1 and further comprising about 0.1% to about 1% of a resin or resin fraction or a mixture thereof.

5. The emulsion of claim 1 and further comprising 0 to about 30% of essentially petroleum ditillate-free petroleum distillation residue.

6. The emulsion of claim 5 wherein the residue is heavy residual fuel.

7. The emulsion of claim 1 and further comprising 0 to about 5% of petroleum distillate.

8. The emulsion of claim 7 wherein the distillate is No. 2 fuel or lighter distillate.

9. The emulsion of claim 1, comprising about 15% to about 40% asphalt cement.

10. The emulsion of claim 1 or 9 wherein the combined weight of asphalt cement and tall oil, tall oil fractions, or mixtures thereof is about 15% to about 55%.

11. The emulsion of claim 10 wherein the combined weight of asphalt cement and tall oil, tall oil fractions, or mixtures thereof is about 35% to about 55%.

12. The emulsion of claim 5 wherein the combined weight of asphalt cement, tall oil, tall oil fractions, or mixtures thereof, and essentially petroleum distillate-free residue is about 35% to about 55%.

13. An essentially petroleum distillate-free prime coat emulsion, comprising about 10% to about 40% asphalt cement, about 3% to about 30% tall oil, tall oil fractions, or mixtures thereof, the tall oil, fractions, or mixtures thereof being present in sufficient quantity that it comprises at least 20%, by weight, of the combined weight of the asphalt cement and tall oil, fractions or mixtures, about 40% to about 65% water, and about 0.2% to about 3% of a strong base, the tall oil, fractions, or mixtures thereof and the strong base functioning as an emulsifier or emulsifying agent.

14. The emulsion of claim 13 wherein the base is sodium hydroxide or potassium hydroxide.

15. The emulsion of claim 13 and further comprising about 0.1% to about 5% of a resin or resin fractions or mixtures thereof.

16. The emulsion of claim 13 and further comprising about 0.1% to about 5% of petroleum distillate.

17. An essentially petroleum distillate-free prime coat emulsion, comprising about 30% to about 50% tall oil, tall oil fractions or mixtures thereof, about 50% to about 70% water, and about 0.1% to about 5% of a strong base, the tall oil, fractions or mixtures there of and the strong base functioning as an emulsifier or emulsifying agent.

18. The emulsion of claim 17 wherein the strong base is sodium hydroxide or potassium hydroxide.

19. An essentially petroleum distillate-free prime coat emulsion, comprising about 5% to about 25% tall oil, tall oil fractions or mixtures thereof, about 15% to about 35% of essentially petroleum distillate-free petroleum distillation residue, the tall oil, fractions, or mixtures thereof being present in sufficient quantity that it comprises at least 20%, by weight, of the combined weight of the tall oil, fractions or mixtures and the essentially petroleum distillate-free petroleum distillation residue, about 50% to about 70% water, and about 0.1% to about 2% of a strong base, the tall oil, fractions, or mixtures thereof and the strong base functioning as an emulsifier or emulsifying agent.

20. The emulsion of claim 19 wherein the strong base is sodium hydroxide or potassium hydroxide.

* * * * *